US008065806B2

(12) United States Patent
Rainone et al.

(10) Patent No.: US 8,065,806 B2
(45) Date of Patent: Nov. 29, 2011

(54) MULTI-PINION GEAR DIGITAL BEAM TORQUE WRENCH

(75) Inventors: Michael D. Rainone, Palestine, TX (US); Daniel Baxter, Tomball, TX (US); Thao D. Hovanky, San Francisco, CA (US)

(73) Assignee: Brown Line Metal Works, LLC, Chicago, IL (US)

( * ) Notice: Subject to any disclaimer, the term of this patent is extended or adjusted under 35 U.S.C. 154(b) by 140 days.

(21) Appl. No.: 12/425,568

(22) Filed: Apr. 17, 2009

(65) Prior Publication Data

US 2009/0260491 A1 Oct. 22, 2009

Related U.S. Application Data

(60) Provisional application No. 61/046,179, filed on Apr. 18, 2008.

(51) Int. Cl.
*G01B 5/24* (2006.01)

(52) U.S. Cl. .................................... 33/1 PT; 33/501.03

(58) Field of Classification Search .................. 33/1 PT, 33/501.13

See application file for complete search history.

(56) References Cited

U.S. PATENT DOCUMENTS 1,925,219 A 9/1933 Weigt
2,007,880 A 7/1935 Sharp
2,159,373 A 5/1939 Dunn
2,250,941 A 7/1941 Zimmerman
2,269,503 A 1/1942 Zimmerman
2,367,224 A 1/1945 Larson et al.
3,274,827 A 9/1966 Sturtevant
3,304,772 A 2/1967 Campbell (Continued)

FOREIGN PATENT DOCUMENTS

EP 2110206 A1 * 10/2009

OTHER PUBLICATIONS

Extended European Search Report for EP Application No. 09158175. 1-1262, dated Jul. 16, 2009.

*Primary Examiner* — Yaritza Guadalupe-McCall
(74) *Attorney, Agent, or Firm* — Marshall, Gerstein & Borun LLP

(57) ABSTRACT

A digital torque wrench includes a position sensor assembly which measures the movement of a load beam with respect to an indicator beam to determine the torque being applied to a working element by the torque wrench. The position sensor assembly includes a first position sensor portion having multiple rotatable pinion gears coupled to a potentiometer, and includes a second position sensor portion having a rack gear that engages one of the pinion gears of the first position sensor portion. The first and second position sensor portions are attached to different ones of the load beam and the indicator beam so that at least one of the pinion gears rotates along the rack gear in response to force (torque) being applied through the load beam to the working element. Rotation of the pinion gears causes rotation of a potentiometer element, which produces a signal indicative of the relative displacement of the load beam with respect to the indicator beam. This displacement is then converted to a torque measurement and is displayed to a user via a display. The use of multiple pinion gears enables a high degree of resolution with respect to the torque measurements, while reducing the width profile of the torque wrench.

8 Claims, 9 Drawing Sheets

U.S. PATENT DOCUMENTS 3,525,256 A 8/1970 Stasiek et al.
3,550,279 A * 12/1970 Fapiano .................... 33/501.03
3,726,134 A 4/1973 Grabovac
4,073,187 A 2/1978 Avdeef
4,558,601 A 12/1985 Stasiek et al.
4,664,001 A 5/1987 Denman
4,665,756 A 5/1987 Snyder
4,762,007 A 8/1988 Gasperi et al.
4,805,464 A 2/1989 Grabovac
6,070,506 A 6/2000 Becker
6,276,243 B1 8/2001 Jenkins
6,463,811 B1 10/2002 Putney
6,481,272 B1 * 11/2002 Kieselbach .................. 33/1 PT
6,732,438 B2 * 5/2004 Enzinna ....................... 33/1 PT
7,017,274 B2 * 3/2006 Stobbe ......................... 33/1 PT
7,082,865 B2 8/2006 Reynertson, Jr.
7,089,834 B2 8/2006 Reynertson et al.
7,367,250 B2 5/2008 Rainone et al.
7,765,702 B2 * 8/2010 Schirp et al. .................... 33/1 N
2003/0182809 A1 * 10/2003 Enzinna ....................... 33/1 PT
2007/0095155 A1 5/2007 Rainone et al.
2011/0000744 A1 * 1/2011 Smith .......................... 33/1 PT

* cited by examiner

MULTI-PINION GEAR DIGITAL BEAM TORQUE WRENCH

REFERENCE TO RELATED APPLICATION

This application is based on and claims the benefit of priority to U.S. Provisional Application No. 61/046,179, entitled "Multi-Pinion Gear Digital Beam Torque Wrench" filed Apr. 18, 2008, the entire disclosure of which is hereby expressly incorporated herein by reference.

FIELD OF TECHNOLOGY

The present disclosure relates generally to digital torque wrenches, and more particularly to a compact digital torque wrench that uses a rack and pinion sensor system to reduce the wrench profile.

SUMMARY

A digital torque wrench includes a position sensor assembly which measures the movement of a load beam with respect to an indicator beam to determine torque being applied to a working element. The position sensor assembly includes a first position sensor portion having multiple rotatable pinion gears coupled to a potentiometer, and includes a second position sensor portion having a rack gear that engages one of the pinion gears of the first position sensor portion. The first and second position sensor portions are attached to different ones of the load beam and the indicator beam so that at least one of the pinion gears rotates along the rack gear in response to force being applied through the load beam to a working element. Rotation of the pinion gears causes rotation of a potentiometer element, which produces a signal indicative of the relative displacement of the load beam with respect to the indicator beam. This displacement is then converted to a torque measurement and is displayed to a user via a display. The use of multiple pinion gears enables ease of manufacture, while reducing the width and height profile of the torque wrench. This configuration also enables the indicator beam to be connected to the load beam away from the ratchet head and closer to the handle portion, making for a less cumbersome and more ergonomic tool.

DETAILED DESCRIPTION

Figure 1:
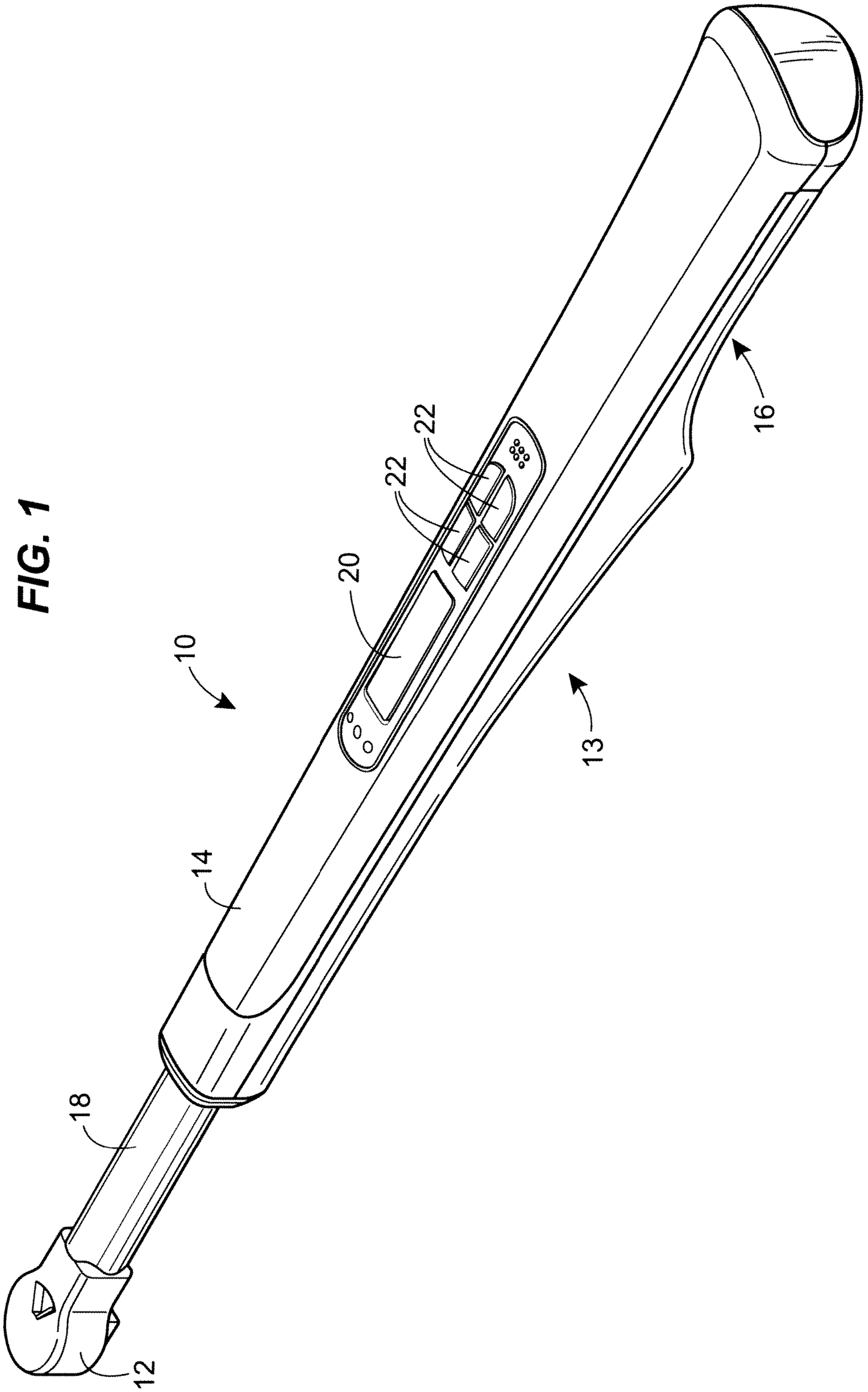
FIG. 1 depicts a perspective view of a compact digital torque wrench.

Referring now to FIG. 1, a digital beam torque wrench 10 includes a ratchet head 12 and a handle assembly 13 including an outer handle cover 14 with an integrally molded handle portion 16 formed on one end thereof. A load beam 18, also referred to herein as a main beam, is partially surrounded by the handle cover 14 and connects the handle assembly 13 to the ratchet head 12. The ratchet head may be, for example, a ⅜" drive reversible ratchet head or any other drive element. In some embodiments, the ratchet head may be removable. As indicated in FIG. 1, an electronic display or indicator 20, which may be an LCD display, a light emitting diode (LED) display, or some other display, and various user manipulatable buttons 22 are disposed within the handle assembly 13 and are accessible through the handle cover 14. The display 20 presents a digital display to the user regarding various measurements determined by a sensor assembly and computational electronics of the digital torque wrench 10, including, for example, the torque currently being applied by the torque wrench 10 to a work element (such as a nut or a bolt of a nut and bolt assembly) at any particular time.

Figure 2:
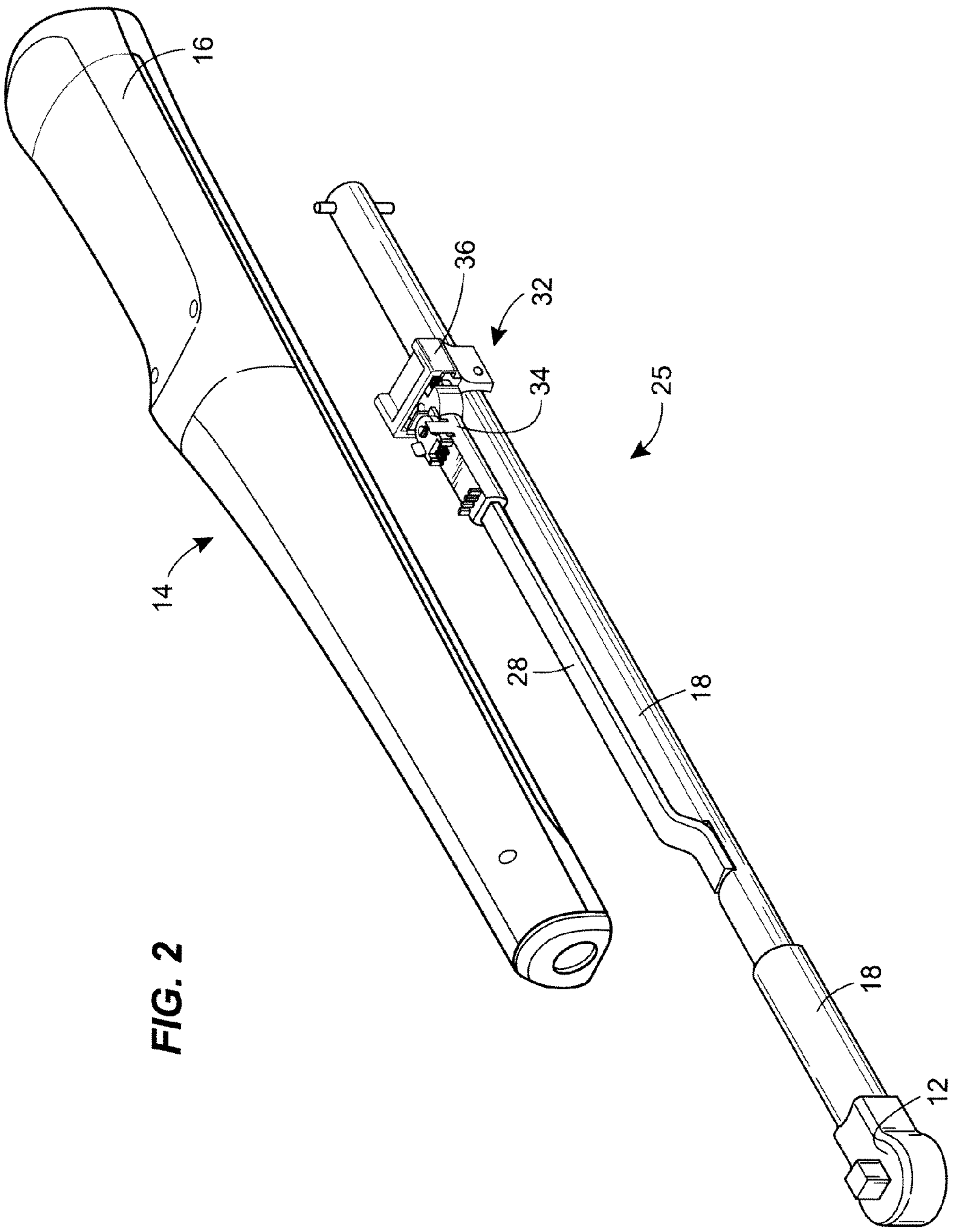
FIG. 2 depicts an exploded view of the compact digital torque wrench of FIG. 1, including a handle cover assembly removed from a beam and sensor assembly.

FIG. 2 illustrates an exploded view of the digital torque wrench 10 in which the handle cover 14 and the associated electronic display 20 and buttons 22 encapsulated thereby are removed from a beam and sensor assembly 25 normally disposed, for the most part, inside the handle cover 14. As will be understood, the beam and sensor assembly 25 is generally made up of two beams, including the load beam 18 and an indicator beam 28, and includes a position sensor assembly 32 having a first position sensor portion 34 mounted on a proximal end of the indicator beam 28 and a second position sensor portion 36 mounted on a proximal end or portion of the load beam 18. More particularly, as illustrated in FIG. 2, the main or load beam 18 extends down the length of the torque wrench 10 inside the handle cover 14 and extends from the handle cover 14 to attach to the ratchet head 12. The indicator beam 28, also referred to herein as a secondary beam, is rigidly mounted to the load beam 18 at a distal end or side of the indicator beam 28. Here, the terms distal and proximal are in reference to the handle portion 16. Thus, in the embodiment illustrated in FIG. 2, the indicator beam 28 has a distal portion (when measured with respect to the handle portion 16 of the digital torque wrench 10) which is mounted substantially at a distal end or on a distal side of the load beam 18 to which the ratchet head 12 is attached.

As illustrated in FIG. 2, the indicator beam 28 may be a flat, elongated beam and the distal end of the indicator beam 28 may be welded to or otherwise permanently affixed or rigidly connected to, for example, a flattened section of the load beam 18 substantially at the distal end of the load beam 18, preferably inside the handle cover 14. However, if desired, a separate mounting member may be used to rigidly attach or affix the indicator beam 28 to the load beam 18 at the distal ends or sides thereof. Moreover, if desired, the indicator beam 28 may be rigidly connected to or mounted onto the load beam 18 at other locations. It is also noted that the indicator beam 28 also may be shaped as an i-beam or have another structurally efficient configuration.

Generally speaking, the position sensor assembly 32 may be made up of a rack and pinion type of gearing mechanism, in which a rack gear, mounted onto one of the load beam 18 or the indicator beam 28, is in geared communication with one or more pinion gears which are rotatably mounted to the other one of the load beam 18 and the indicator beam 28. With this arrangement, movement of the first portion of the position sensor assembly 34 with respect to the second portion of the position sensor assembly 36 causes the pinion gear(s) to rotatably move along the rack gear, with the amount of rotation indicating relative movement between the proximal end of the indicator beam 28 and the proximal end or portion of the load beam 18.

Figure 5:
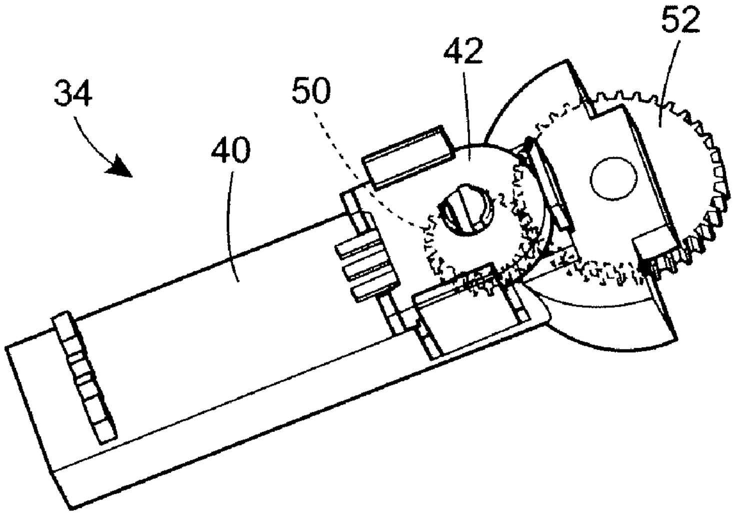
FIG. 5 illustrates a first portion of the sensor assembly of FIG. 3.
Figure 6:
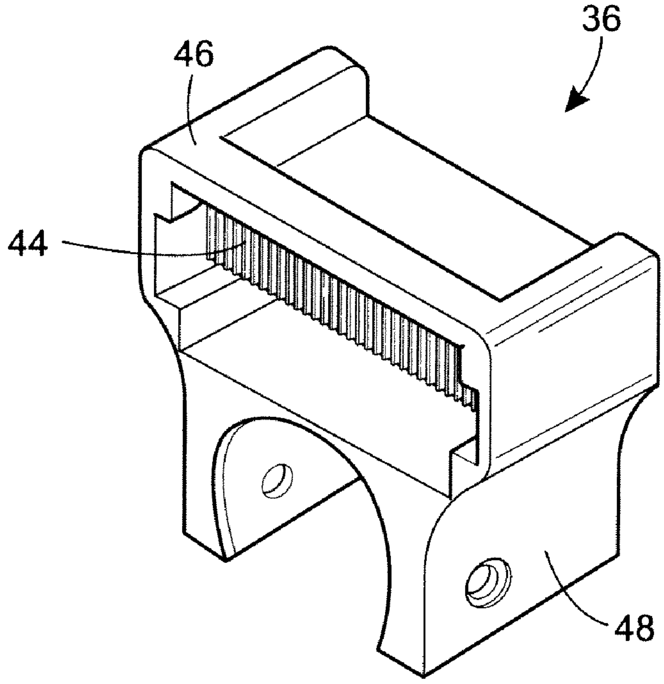
FIG. 6 illustrates a second portion of the position sensor assembly of FIG. 3.

More particularly, when force is applied to the load beam 18, via the handle cover 14, the proximal end of the indictor beam 28 moves in relation to the proximal end of the load beam 18, as torque is transferred to the ratchet head 12 through the load beam 18 but is not transferred to the ratchet head 12 through the indicator beam 28. The first and second portions 34 and 36 of the sensor assembly 32 thereby move in relation to one another in an amount indicative of or related to the torque applied to the load beam 18. The specific operation of the position sensor assembly 32 in response to movement of the indicator beam 28 with respect to the load beam 18, when torque is applied to the handle portion 16 of the torque wrench 10, can be better understood with respect to FIGS. 3-6. Generally speaking, FIG. 3 illustrates the digital torque wrench 10 with half of the handle cover 14 removed, FIG. 4 illustrates the position sensor assembly 32 in more detail, FIG. 5 illustrates a perspective view of the first position sensor assembly portion 34, and FIG. 6 illustrates a perspective view of the second position sensor assembly portion 36.

Figure 3:
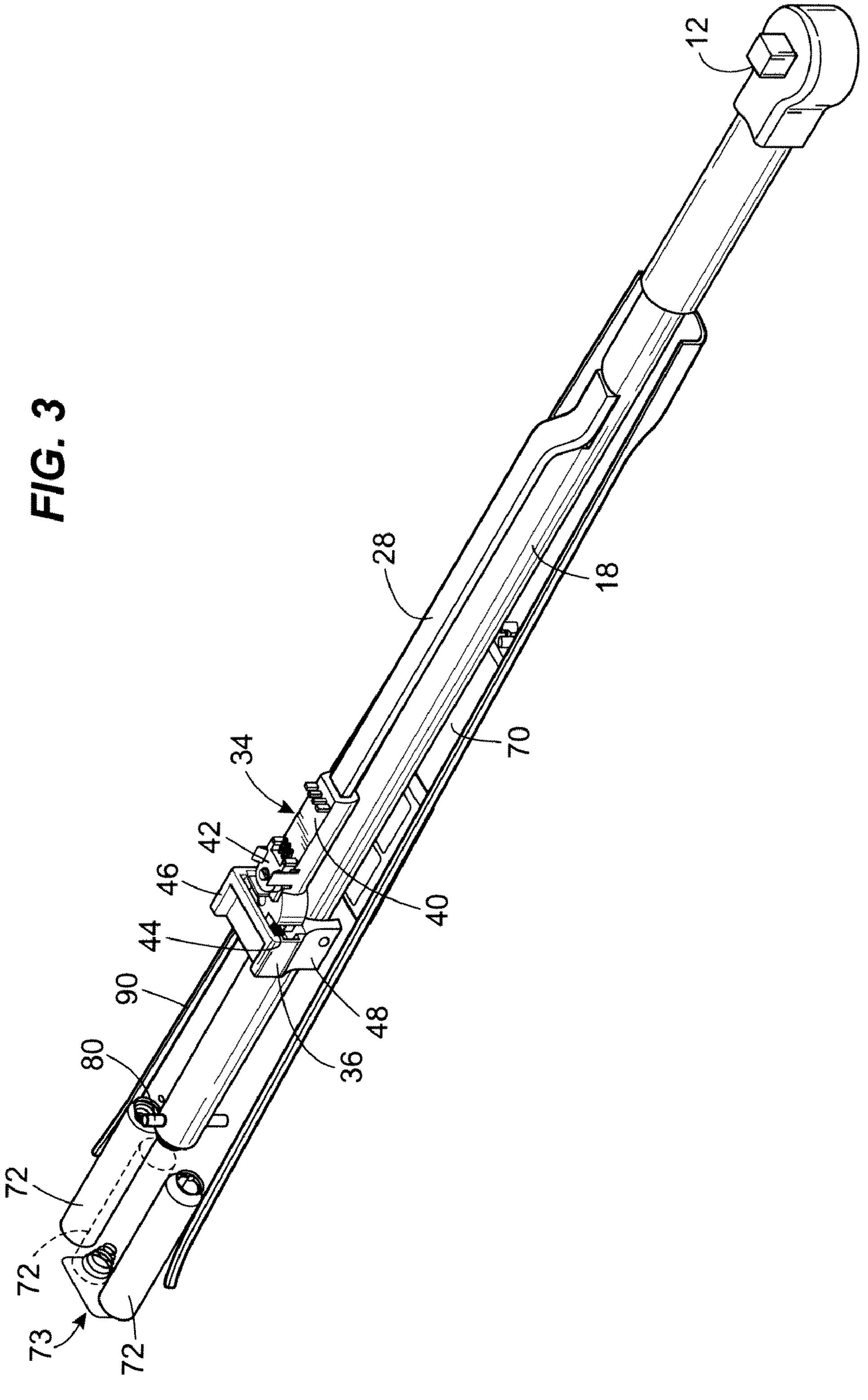
FIG. 3 depicts a cut-away view of the digital torque wrench of FIG. 1 with a portion of a handle cover removed.

As illustrated in FIG. 3, the indicator beam 28 is preferably a flattened, elongated beam in which the flattened width of the indicator beam 28 is wider than the height of the beam 28, in order to provide structural integrity to the indicator beam 28, and to prevent the indicator beam 28 from bending or twisting in response to any forces that might be applied thereto via the sensor assembly 32. Moreover, the flattened nature of the indicator beam 28 provides a lower height profile for the digital torque wrench 10. As illustrated in FIGS. 3 and 5, the first position sensor assembly portion 34, which is mounted on the proximal end of the indicator beam 28, includes a gear cover 40, a potentiometer 42 and two rotatable pinion gears 50 and 52 disposed within the gear cover 40 (as best illustrated in FIG. 5). The potentiometer 42, which may be a rotating type of potentiometer, extends through the gear cover 40 and has a rotatable element connected to a first one of the rotating pinion gears 50. Likewise, as illustrated in FIGS. 3 and 6, the second position sensor assembly portion 36 includes a rack gear 44 disposed beneath a rack gear cover 46, both of which are rigidly attached to a rack assembly mount 48 which, in turn, is rigidly mounted onto the load beam 18.

As illustrated in FIG. 3, the gear cover 40 includes an input portion to receive one end of the indicator beam 28. If desired, the indicator beam 28 may be held in place by friction inside the input portion of the gear cover 40 or, alternatively, these components may be welded or glued together. Also, it will be appreciated that the rectangular shape of a cross-sectional section of the indicator beam 28 advantageously provides a secure fit between the gear cover 40 and the input portion of the gear cover 40. More specifically, the gear cover 40 cannot easily rotate relative to the indicator beam 28.

Figure 4:
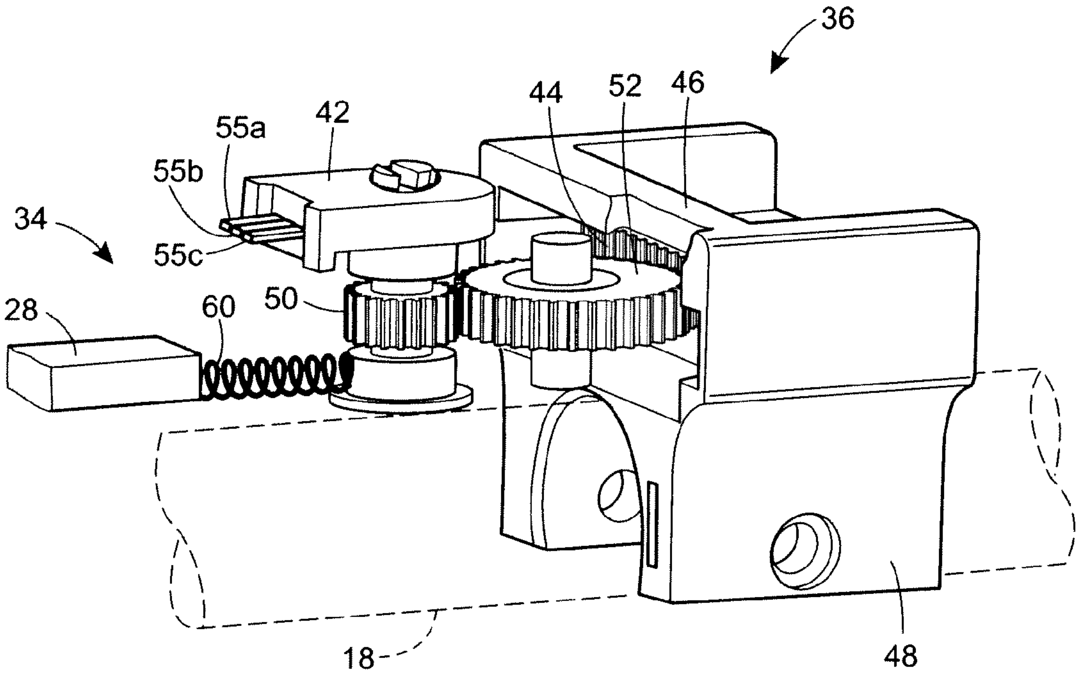
FIG. 4 depicts an enlarged, perspective view of the sensor assembly of the digital torque wrench of FIGS. 1-3 with a gear cover removed.

FIG. 4 depicts an expanded view of the first and second position sensor assembly portions 34 and 36 with the gear cover 40 removed and the rack gear cover 46 partially cutaway. As illustrated in this figure, the potentiometer 42 of the first position sensor assembly portion 34 is mounted to a center axis of the first pinion gear 50. The first pinion gear 50 (which is rotatably mounted on and rides with the gear cover 40, not shown in FIG. 4) is freely rotatable around its center point (not shown) and is in geared connection with the second pinion gear 52, which has a larger diameter than the first pinion gear 50. The second pinion gear 52 is also rotatably mounted on and rides with the gear cover 40, as best illustrated in FIG. 5.

Referring again to FIG. 4, the second pinion gear 52 is in toothed or geared engagement with both of the first pinion gear 50 and the rack gear 44. Moreover, the second pinion gear 52 is movable (with the gear cover 40) in a direction generally perpendicular to (and more specifically in an arcuate manner with respect to) the longitudinal axis of the load beam 18. The rack gear 44 is preferably a straight rack gear, or a curved (arcuate) rack gear to match relative indicator beam motion, and is rigidly mounted to the rack gear mount 48 which, in turn, is rigidly mounted directly onto the load beam 18.

During operation, that is, when force is applied by a user to the load beam 18 through the handle portion 16 of the digital torque wrench 10, the load beam 18 flexes in response to the torque while the indicator beam 28 does not flex, as no torque is applied to or propagated through the indicator beam 28. The second pinion gear 52 of the first position sensor assembly portion 34, which is mounted onto the proximal end of the indicator beam 28, then moves along the length of the rack gear 44, as the rack gear 44 moves generally perpendicularly (or arcuately) to the longitudinal axis of the indicator beam 28, thereby causing rotation of the second pinion gear 52. Rotation of the second pinion gear 52 causes rotation of the first pinion gear 50, which in turn, causes rotation of the rotatable element of the potentiometer 42, thereby altering the electrical output characteristic of the potentiometer 42. The potentiometer 42 then outputs an electrical signal indicative of that electrical characteristic on one of the pins 55*a*, 55*b* or 55*c* (illustrated in FIG. 4) in response to, e.g., a voltage or current signal being applied to the other two of the pins 55*a*, 55*b* and 55*c*.

Alternatively, the second pinion gear 52 may engage a mechanical displacement indicator. As one example, a pointer such as a needle may be rigidly mounted on the same axis as the second pinion gear 52, and the position sensor assembly 32 may include a dial having divisions to which the point of the needle may point to indicate the amount of displacement.

Because the rack gear 44 is a straight rack gear, and the load beam 18 will actually move in an arcuate path with respect to the longitudinal axis of the indicator beam 28, the pinion gear 52 will tend to move away from the rack gear 44 as the pinion gear 52 moves towards the outer edges of the rack gear 44. To ensure that there is tight engagement between the individual gears of the pinion gear 52 and the individual gears of the rack gear 44 at all positions of movement along the rack gear 44, a spring 60 disposed inside the gear cover 40 forces the gear cover 40, and thus the second pinion gear 52, up against the rack gear 44 at all points of movement of the second pinion gear 52 along the rack gear 44. The spring 60, which may be a compression spring with a relatively high compression force, may have one end disposed up against an end of the indicator beam 28 and a second end which presses either against a lower portion of the pinion gear 50 or some other mechanical structure within the gear cover 40. That is, the spring 60 needs only to press up against an interior wall of the gear cover 40 (not shown) to force the entire gear cover 40 (on which the pinion gears 50 and 52 are mounted) towards the rack gear 44. Because both of the pinion gears 50 and 52 are rotatably mounted within the gear cover 40 and move with the gear cover 40, the force applied to the gear cover 40 by the spring 60 towards the rack gear 44 keeps the pinion gear 52 in tight engagement with the rack gear 44 at all points along the length of the rack gear 44. It will be understood however, that the gear cover 40 can move away from and towards the end of the indicator beam 28 only along the longitudinal axis of the indicator beam 28, and cannot move laterally with respect to the indicator beam 28. Thus, the gear cover 40 is rigidly fixed to the indicator beam 28 in the lateral direction of the indicator beam 28.

As will be understood, rotation of the pinion gear 52 along the rack gear 44 causes rotation of the pinion gear 50, which rotation is measured by the potentiometer 42 to indicate a movement of the load beam 18 with respect to the indicator beam 28. In this manner, the movement of the load beam 18 with respect to the indicator beam 28 is precisely measured by the potentiometer 42 to indicate the amount of torque being applied by a user to the load beam 18.

The use of the two pinion gears 50 and 52 enables the torque wrench 10 to have a smaller width profile, as the pinion gear 50 will rotate a greater amount and thus have a greater angular resolution in response to the rotation of the pinion gear 52 along the rack gear 44 than the larger pinion gear 52. It is preferable to configure the pinion gear 50 to make use of the full or near full range of rotatable motion of the potentiometer 42. This dual pinion gear mechanism allows the torque wrench 10 to have a smaller width profile by inducing a large amount of potentiometer rotation with small amount of relative motion between the rack gear 44 and the pinion gear 52. Moreover, the double pinion gear arrangement allows the pinion gear 50 and, accordingly, the potentiometer 42, to be disposed away from the rack gear 44, making the wrench easier to manufacture, simplifying the installation of the potentiometer 42 and related elements, and reducing the size profile of the wrench. While two pinion gears of different sizes are illustrated as being used in the embodiment illustrated in FIGS. 1-7 herein, more then two pinion gears could be used to provide for a different profile, more space inside the handle, etc. and the pinion gears could be of the same or different sizes.

Figure 7:
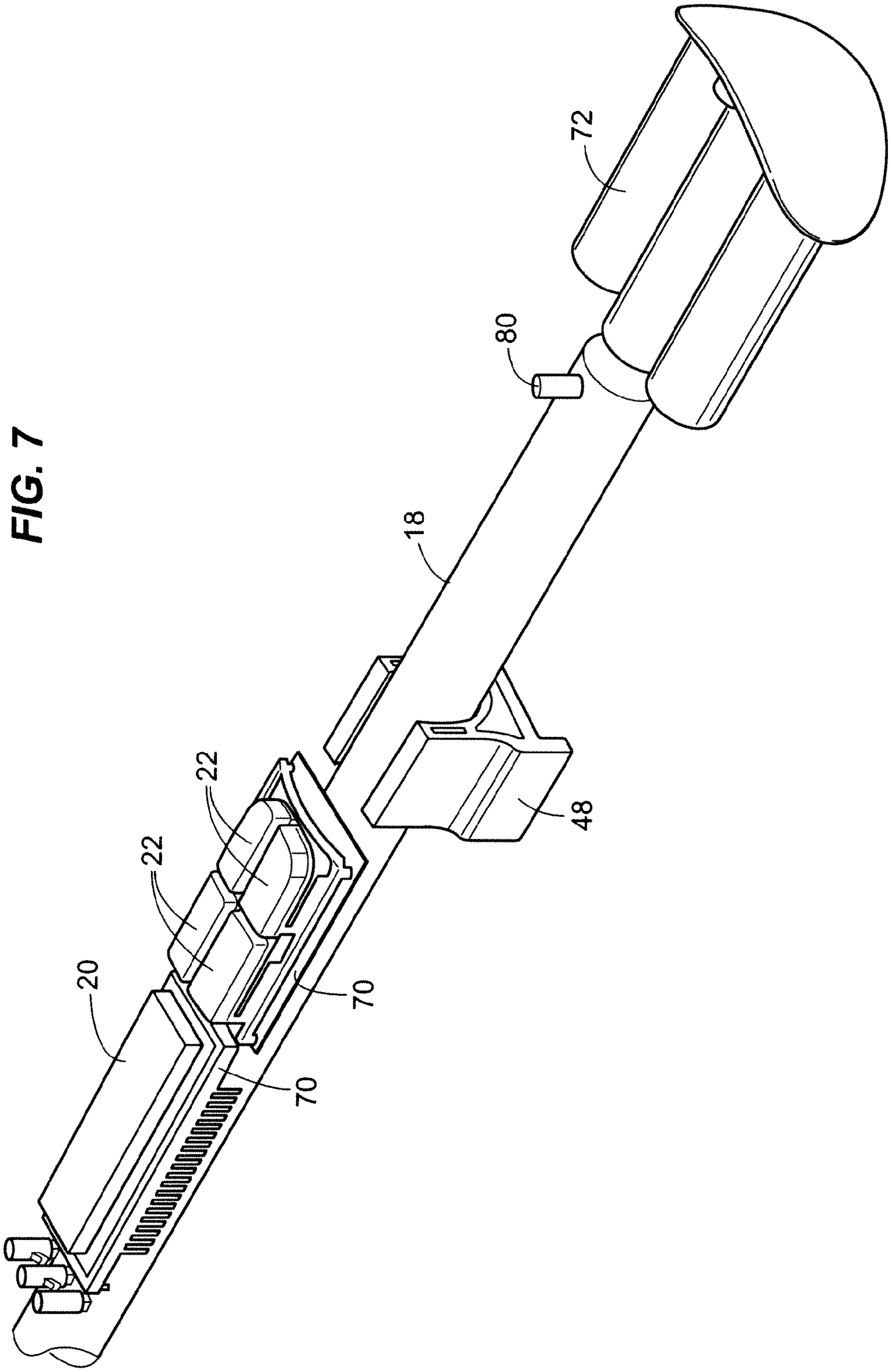
FIG. 7 illustrates a second, cut-away view of the digital torque wrench of FIG. 1 depicting a liquid crystal display (LCD) display mounted on an electronics circuit board.

Referring again to FIG. 3 and to FIG. 7, the handle cover 14 may additionally house the electronics necessary for computing and displaying information on the digital display 20, as well as for accepting user input via the buttons 22. In particular, as illustrated in FIGS. 3 and 7, an electronics circuit board 70 is disposed adjacent the load beam 18 opposite from the first position sensor assembly portion 34. The electronics circuit board 70 is electrically connected to and is powered by batteries 72 which are housed in a compartment at one end of the handle cover 14, indicated by reference number 73 in FIG. 3. The electronics circuit board 70, as well as the digital display 20 is illustrated in more detail in FIG. 7. The digital display 20 may be any kind or type of standard LED, LCD, combined LCD and LED display or other type of digital display, while the electronics powering and controlling this display may be disposed on the circuit board 70 in the form of one or more electronic chips, individual electronic components or a combination thereof. Of course, the specifics of the electronics, which can be easily configured by those skilled in the art, are not critical to the operation of the digital torque wrench 10. As will be understood, the electronics on the circuit board 70 are electrically connected to the pins 55*a*, 55*b* and 55*c* of the potentiometer 42, and provide a known input or reference signal (such as a known voltage signal) to two of the pins 55*a*, 55*b* and 55*c* of the potentiometer 42 and receive a signal out of the third one of the pins 55*a*, 55*b* and 55*c* of the potentiometer 42 (via electrical wires or connections not shown in FIG. 7) indicative of the rotational position of the moveable element of the potentiometer 42.

Various types of functionality may be programmed (using any combination of software, firmware, or hardware components) into the digital circuitry on the electronics board 70, to enable, for example, the electronics circuitry to display the actual torque currently being applied to a working element via the ratchet head 12. If desired, one of the buttons 22 may be used to reorient the manner in which the digital display 20 displays numbers so that, in one case, the numbers may be displayed 180 degrees upside down with respect to another case, so that the digital display 20 is easily readable when using the digital torque wrench 10 in either a left-handed or a right-handed manner.

Preferably, the handle cover 14 transfers force applied thereto to the load beam 18 through a dowel pin 80, illustrated in FIG. 3. In this manner, all of the pressure or force being applied on the handle assembly 13 by a user through the outside of the handle cover 14 is directed through the dowel pin 80, and is thus applied to a predetermined location on the load beam 18, regardless of where the force is actually imparted by the user onto the handle cover 14. Thus, the dowel pin 80 enables accurate and consistent torque readings no matter where the user applies force on the handle cover 14.

While the digital torque wrench of FIGS. 1-7 is illustrated as including a socket head 12, other types of working heads or working element engagement mechanisms can be used instead, such as screwdriver heads or other attachment mechanisms, to enable torque to be applied to a working element via other types of structure than a socket. Moreover, as illustrated in FIG. 3, the rigid construction of the handle cover 14 may assist an even transfer of force applied on the handle cover 14 by a user to the dowel pin 80.

As will be understood, the digital torque wrench 10 described herein is a new generation of smart tool design that uses a rack and pinion driven potentiometer assembly to measure the amount of torque being applied by the tool. The circuitry on the circuit board 70 converts signals generated by the potentiometer 42 to torque measurements and displays these torque measurements on the LCD/LED display 20. Preferably, the buttons 22 may enable a user to choose between foot-pounds, inch-pounds and Newton-meters or any other desired units of torque measurement. If desired, the circuitry may turn itself off after some period of time, such as three minutes, of not being used, to save battery life. Still further, the user may be able to use one or more of the buttons 22 to set a target torque measurement. In this case, when the user begins to apply torque, a green LED on the display 20 may turn on to indicate the application of some torque, which will be indicated as a result of some movement of the potentiometer 42. When the target measurement approaches a predetermined percent of the target torque, such as 80 or 90 percent of the target amount, a yellow LED on the display 20 may turn on, and a speaker disposed on the circuit board 70 may emit a short series of audible beeps. When the torque measurement has reached the target value, a red LED on the display 20 may turn on, and the speaker may emit a continuous audible beep for some predetermined period of time, such as for two seconds or more.

Likewise, if desired, when the torque measurement approaches preset amount over the target torque amount, such as 105 percent of the target amount, the red LED may begin blinking and a second and possibly different audible signal, such as another series of short beeps may be given off. Still further, the highest torque reading may be set to remain on the display 20 until the display 20 is reset by the user via the buttons 22. If desired, a first one of the buttons 22, called a power button, may operate to apply power to turn the unit on and may be used, for example, to change the displayed readings from foot-pounds to inch-pounds to Newton-meters by pressing and holding this button down a predetermined amount of time. The power may be turned on or off by holding this button down three or more seconds or some other desired value. A second one of the buttons 22 may be a memory button which may be used to save a target torque value or the last measured torque value. Still further, third and fourth ones of the buttons 22 may be "up" and "down" buttons, which may be used to move the target torque value up and down by preset amounts when the user is specifying this target torque value. After achieving and desired target torque value, the memory button may be used (by being held down for three seconds for example) to save the new target torque value. At this time, the display 20 may display zeros. Depressing the up button and the down button simultaneously for a predetermined time, such as for three seconds, may cause the circuitry to rotate the information on the LCD display 20 by 180 degrees, which will enable both left-handed and right-handed operation of the digital torque wrench 10. This operation may also switch or reverse the orientation of the "up" and "down" buttons.

If desired, the load beam 18 may be ⅝ inches in diameter, and is preferably heat-treated, oil-quenched and tempered in a controlled manner to obtain nominal strength or hardness of, for example, RC42. Additionally, the load beam 18 may have stiffness properties that are controlled during the alloy process to be, for example, 30,000,000 psi (pounds per square inch). In some embodiments, the load beam 18 may be made from a chromium vanadium alloy. The indicator beam 28 may be a steel element that drives the potentiometer 42. The indicator beam maintains its straightness during operation of the torque wrench 10, and this beam should be protected by being free from any contact within the housing cover 14 during operation of the digital torque wrench 10. Still further, the gears 44, 50 and 52 may be hobbed metal gears, to ensure minimum tooth-to-tooth and composite tooth profile errors. However, it is also possible to mold the gears out of plastic, as the molding process can achieve very high tolerances and is much less expensive than producing hobbed gears. Also, it is desirable to heat-treat and cold-form the beams 18 and 28. The handle or cover portion 14, which may be made of plastic, may be formed in a clam-shell design, having a top half and a bottom half which may be fastened together using self-fastening screws, ultrasonic or induction welding or some other fastening method. In some embodiments, an over-mold layer provides a comfortable non-slip cover. However, the handle cover 14 should be made from a material or a combination of materials that will maintain a high degree of stiffness and impact strength. Still further, while the digital torque wrench 10 is described herein as having the indicator beam 28 rigidly fastened to the load beam 18 at the distal ends or portions thereof, so that the position sensor assembly 32 is disposed at the proximal ends or portions of these beams, the indicator beam 28 could be rigidly fastened to the load beam 18 at the proximal ends thereof, so that the position sensor assembly 32 is disposed at the distal ends or portions of these beams. Moreover, while the pinion gears 50 and 52 of the rack and pinion gearing sensor assembly 32 are illustrated herein as being disposed on or mounted to the indicator beam 28 and the rack gear 44 of the rack and pinion gearing sensor assembly 32 is illustrated herein as being disposed on or rigidly mounted to the load beam 18, the pinion gears 50 and 52 could instead be disposed on or mounted on the load beam 18 while the rack gear 44 could be disposed on or mounted to the indicator beam 28.

In order to compute the torque being applied to the working element based on the displacement of the load beam 18 with respect to the indicator beam 28, any known or desired equations or computation method may be implemented within the circuitry on the circuit board 70 to determine torque measurements based on the electrical output of the potentiometer. The computational circuitry may include hardwired or hard coded analog and/or digital circuitry, software executed in a processor, etc.

Figure 8:
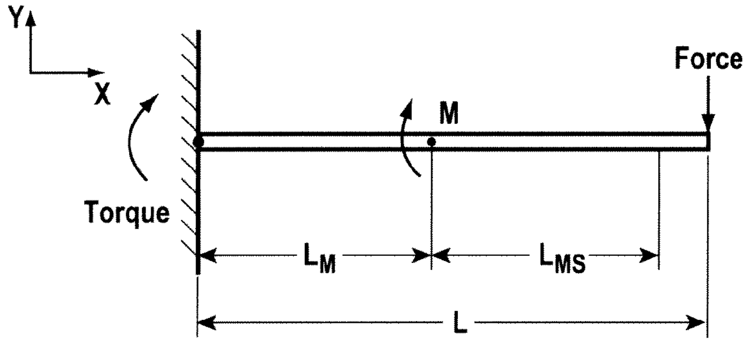
FIG. 8 illustrates a first free body diagram of a load beam of the torque wrench when no force is applied to a handle of the torque wrench.

To enable parametric engineering of the digital torque wrench 10, a mathematical model based on the free body diagram of FIG. 8 may be used to determine critical or useful engineering data, such as the values for the safety factor of the wrench, relative measurable deflection, gear sizing and measurable gear rotation. In the free body diagram of FIG. 8:

Length (L) is the length from the center of the bolt (working element) being torqued to the point at which the user applies force on the wrench (i.e., the dowel 80).

Force is the force that the user applies to the handle.

Torque is the moment induced on the bolt by the user applied force.

M is the local bending moment where the torque sensor bar (the indicator beam 28) is attached to the load beam 18.

$L_M$ is the length from the center point of the socket or bolt being torqued to the point at which the indicator beam 28 is rigidly attached to the load beam 18.

$L_{MS}$ is the indicator beam length to the interface of the pinion gear 52 and the rack gear 44 (i.e., the measurement point).

For this discussion, the following values will be used, although other vales of the Length, Force, Torque, M, $L_M$ and $L_{MS}$ could be used instead.

$\text{Torque}=150\cdot\text{ft}\cdot\text{lbf}$ $\text{Length}=18.5\cdot\text{in}$ $$\text{Force} = \frac{\text{Torque}}{\text{Length}}$$

Force=97.297 lbf $L_M=4.625$ in $L_{MS}=10\cdot\text{in}$

As the calculations of the stress on the torque bar (the load beam 18) at the fixed end of the load beam 18 and the corresponding safety factor are straightforward to one skilled in the art, these calculations will not be discussed in detail. However, as is known, the material of the load beam 18 as well as the diameter and other physical properties of the load beam 18 should be selected to withstand (without permanent deformation) the maximum desired or measurable torque for which the wrench is being designed plus some additional amount as defined by the safety factor. In one embodiment, with the following material properties and for a maximum torque of 150 ft.-lbs., and a safety factor of 1.5, the rod diameter (of the load beam 18) would need to be 45/64 inch. For a maximum torque of 300 ft. lbs., the rod diameter of 57/64 inch could be used.

Material Properties: (01—tool steel RC hardness 44)

Ultimate Tensile Strength: $UTS=203\cdot10^3\cdot\text{psi}$

Yield Strength: $YS=170\cdot10^3\cdot\text{psi}$

Modulus of Elasticity $E=30\cdot10^6\cdot\text{psi}$.

When designing the torque wrench, it is necessary to determine the amount of relative measurable deflection of the load beam 18 with respect to the indicator beam 28 when the maximum force is applied to the load beam 18. This calculation may be made by first determining the deflection in the load beam 18 with respect to the axis in which the torque is applied (the x-axis of FIG. 8) at various distances (x) from the torque point (i.e., the center of the working element or bolt) when maximum force is applied to the torque wrench, and then determining the position of the proximal end of the indicator beam 28 and the load beam 18 at each of these distances. The x distances at which the deflection of the load beam 18 should be calculated are, specifically, at lengths from the torque point equivalent to $L_M$ and the sum of $L_M$ and $L_{MS}$. The equations below may be used to calculate the deflection of the load beam 18 in response to maximum force at these distances (points) along the x-axis. These deflections are approximated as the distance that a point on the load beam 18 moves in the y-direction (as opposed to the actual arc length of the arc traversed by a point on the load beam 18 as it is deflected). In these equations, the rod diameter (Rod_diam) of the load beam 18 is selected as ⅝ inch.

In particular, with the materials discussed above, the Moment of Inertia (I) for the load beam 18 is:

$$I := \frac{\pi}{4} \cdot \left(\frac{\text{Rod\_diam}}{2}\right)^4$$

With this value, the deflection of the load beam 18 at a point "x" can be determined as:

$$\text{Deflection}(x) = \frac{\text{Force}}{6 * E * I}(x^3 - 3 * \text{Length} * x^2)$$

Thus, the deflection of the load beam 18 from the x-axis at points $x=L_M$ and $x=L_M+L_{MS}$ will be:

$$\text{Deflection}(L_M) = \frac{\text{Force}}{6 * E * I}(L_M^3 - 3 * \text{Length} * L_M^2)$$

$$\text{Deflection}(L_M + L_{MS}) = \frac{\text{Force}}{6 * E * I}\begin{pmatrix} (L_M + L_{MS})^3 - 3 * \\ \text{Length} * (L_M + L_{MS})^2 \end{pmatrix}$$

Figure 9:
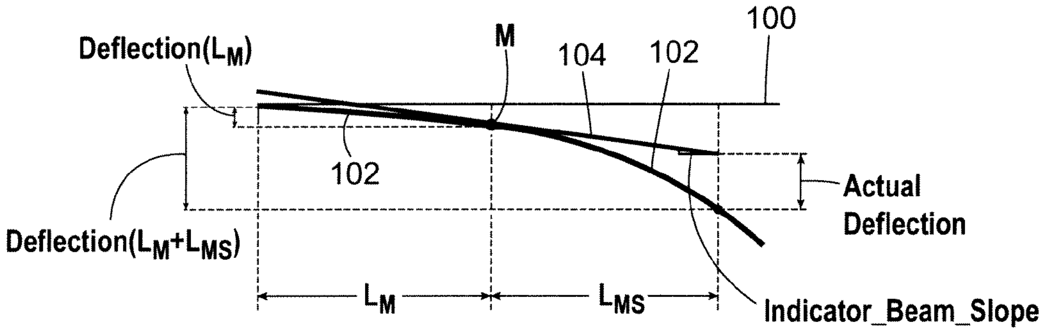
FIG. 9 illustrates a second free body diagram of the load beam and an indicator beam of the torque wrench when force is applied to a handle of the torque wrench.

Now, if the indicator beam 28 is connected to the load beam 18 at the ratchet head 12, the deflection between end of the indicator beam 28 and the load beam 18 at the measurement point (i.e., at the interface between the pinion gear 52 and the rack gear 44), would be equal to Deflection ($L_M+L_{MS}$). However, when, as is the case in the embodiment of the torque wrench illustrated in FIGS. 1-7 herein, the indicator beam 28 is rigidly connected to the load beam 18 away from the ratchet head 12 (i.e., at the point $L_M$), the deflection of the proximal end of the load beam 18 and the end of the indicator beam 28 at the measurement point is not simply:

$$\text{Deflection}(L_M+L_{MS})-\text{Deflection}(L_M)$$

due to the fact that the indicator beam 28, when connected at the point $L_M$, comes off of the load beam 18 at a tangent to the load beam 18. This tangent, however, as illustrated in FIG. 9, is not parallel to the x-axis, due to the deflection of the load beam 18 which already occurs at the length $L_M$. Thus, as illustrated in FIG. 9, the slope of the indicator beam 28 must be taken into account when determining the deflection between the end of the indicator beam 28 and the load beam 18 at the measurement point. In the diagram of FIG. 9, the line 100 represents the position of the load beam 18 without any torque applied. The line 102 represents the position of the load beam 18 with maximum torque applied to the wrench, and the line 104 represents the position of the indicator beam 28 with maximum torque applied by the wrench.

The offset due to the slope of the indicator beam 28 may be determined in any manner, and can specifically be approximated by calculating the deflection of the load beam 18 (from the x-axis) at a point DeltaX on either side of the point $L_M$, and then determining the slope of a line drawn between these two points. So, in this case, the slope of the indicator beam 28 at the point $L_M$ can be determined as:

$$\text{Indicator\_Beam\_Slope} = \frac{-1\begin{pmatrix} \text{Deflection}(L_M + DeltaX) - \\ \text{Deflection}(L_M - DeltaX) \end{pmatrix}}{2 * DeltaX}$$

Now, the distance that the end of the indicator beam 28 will move away from the x-axis at the point $L_M+L_{MS}$ is:

$$\text{Deflection\_Indicator\_Beam}=\text{Deflection}(L_M)+(\text{Indicator\_Beam\_Slope}(L_M)*L_{MS})$$

Therefore, the actual maximum deflection between the indicator beam 28 and the load beam 18 at the measurement point in response to maximum torque being applied is:

$$\text{Actual\_Deflection}=\text{Deflection}(L_M+L_{MS})-\text{Deflection\_Indicator\_Beam}$$

The Actual_Deflection value is the amount of measurable relative deflection seen at the gear rack 44 when maximum (in this case, 150 ft-lbs) of torque is applied in one direction. In order to account for the full range of torque in the opposite direction, this value must be doubled to obtain the full length of the rack gear 44. This full length of the rack gear 44 is equivalent to the arc length required on the pinion gear 50 connected to the potentiometer 42.

Generally speaking, one method utilizes the length of the rack gear 44 to determine the desired arc length (e.g., circumference) of the pinion gear 50 which turns the potentiometer 42. More specifically, to obtain the maximum resolution of torque measurements, it is desirable to use a pinion gear 50 having a diameter and gear pitch such that the arc length of the pinion gear 50 of the full range of rotation available with the potentiometer 42 (e.g., 330 degrees) equals the length of the rack gear 44. That is, the circumference of the pinion gear 50 should be selected to make the arc length of the circumference of the usable range (e.g., the arc length of 330 degrees of the circumference) equal to (or if need be less than) the maximum length of the rack gear 44, as determined above. Because the gear pitch on each of the rack gear 44, the pinion gear 50 and the pinion gear 52 will be the same (in order to provide for smooth gearing operation of the system), the size (e.g., diameter) of the pinion gear 52 may generally be selected so as to move the pinion gear 50 (and thus the potentiometer 42) away from the rack gear 44, to provide more space in which to locate the potentiometer 42 and the associated wires, and thus reduce the profile of the torque wrench 10. Of course, as will be understood, it may not be, in all cases, feasible to use gears of the exact size that will result in use of the full range of rotation of the potentiometer 42. In this case, it is desirable to select the gears 50 and 52 that result in the use of less than the full range of rotation of the potentiometer so as to be able to measurement the maximum torque situation. Doing so, however, will result in less measurement resolution than a system which uses the full range of rotational movement of the potentiometer 42.

While the indicator beam 28 is illustrated as being connected to the load beam 18 near but not at the ratchet head 12, the attachment point of the indicator beam 28 to the load beam 18 could be moved closer to or farther away from the ratchet head 12. This configuration enables the indicator beam 28 to be rigidly connected to the load beam 18 at any desired distance away from the ratchet head 12, including both closer to and farther away from the ratchet head 12, making for a less cumbersome and more ergonomic tool, as this feature can be used to reduce the width of the tool to the size of the load beam 18 near the ratchet head 12.

Figure 10:
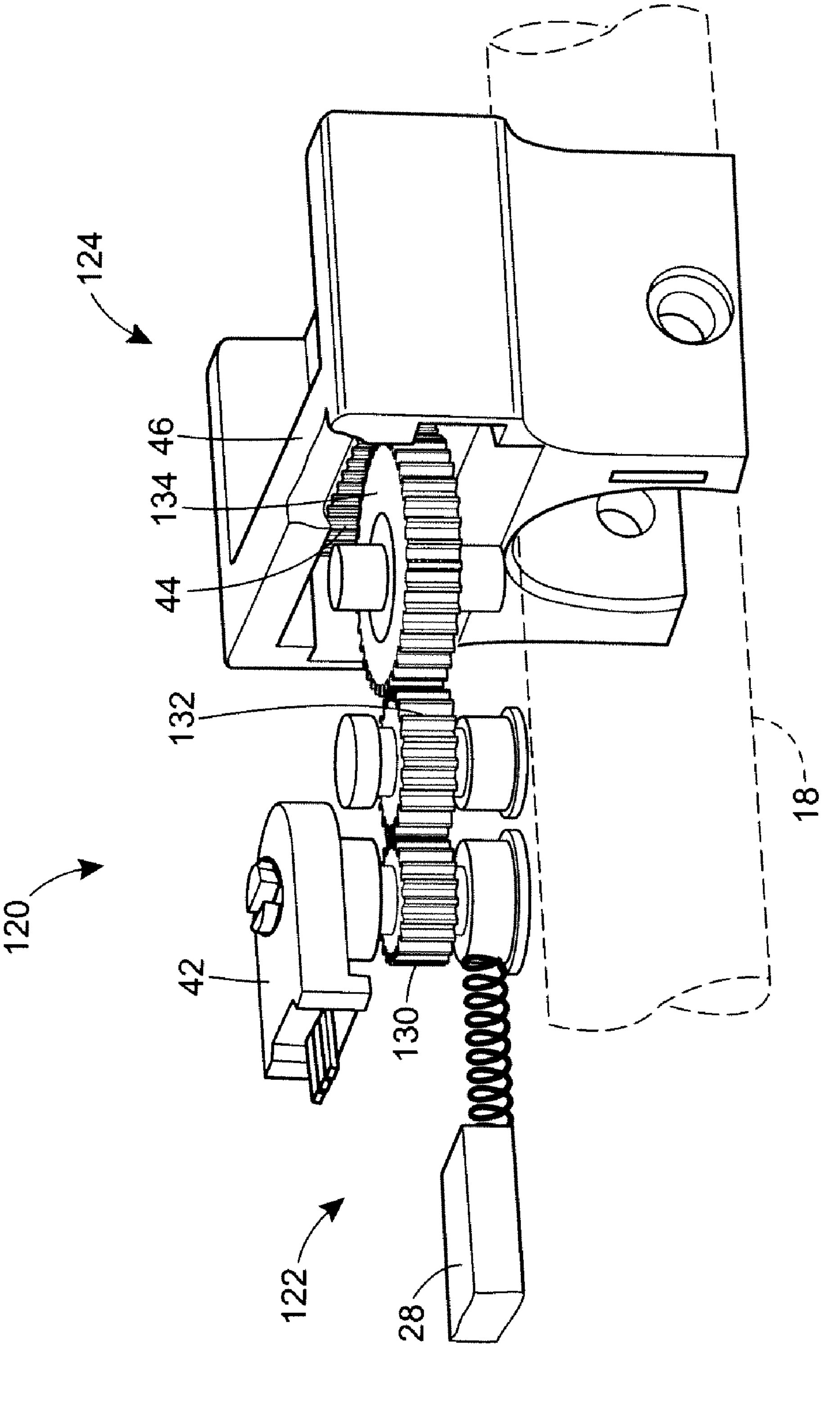
FIG. 10 depicts an enlarged, perspective view of another embodiment of the sensor assembly of the digital torque wrench of FIGS. 1-3 with a gear cover removed.
Figure 11:
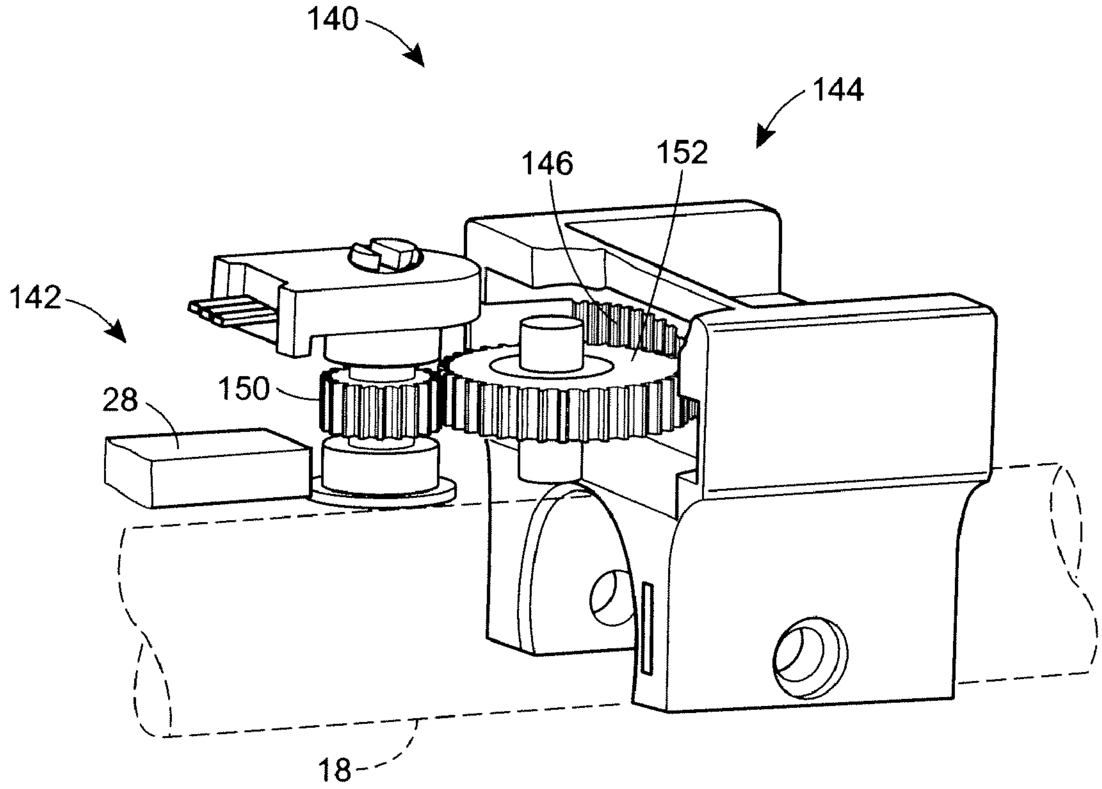
FIG. 11 depicts an enlarged, perspective view of yet another embodiment of the sensor assembly of the digital torque wrench of FIGS. 1-3 with a gear cover removed.

Next, FIGS. 10 and 11 illustrate other examples of a position sensor assembly that the torque wrench 10 may include instead of the position sensor assembly 32 (see FIG. 4). A position sensor assembly 120 illustrated in FIG. 10 includes a first position sensor portion 122 mounted on a proximal end of the indicator beam 28 and a second position sensor portion 124 mounted on a proximal end or portion of the load beam 18. Alternatively, the first position sensor portion 122 can be mounted on the load beam 18 and the second position sensor portion 124 can be mounted on the indicator beam 28. The second position sensor portion 124 is similar or identical to the second position sensor portion 36 discussed with reference to FIG. 4. However, the first position sensor portion 122 includes three pinion gears 130, 132, and 134 to farther remove the potentiometer 42 from the rack gear cover 46 and other parts of the second position sensor portion 124, and to further improve electrical resolution properties of the position sensor assembly 120.

As illustrated in FIG. 10, the potentiometer 42 is mounted on the same axis as first pinion gear 130 that is in geared connection with the second pinion gear 132 that, in turn, is in geared connection with the third pinion gear 134. If desired, the second pinion gear 132 may have a larger diameter than the first pinion gear 130, and the third pinion gear 134 may have a larger diameter than the second pinion gear 132. It is also possible to select a set of pinion gears 130-134 in which two or all three gears have the same diameter. However, by selecting progressively larger pinion gears 130, 132, and 134, it is possible to generate a greater angle of rotation of the first pinion gear 130 for a corresponding angle of rotation of the third pinion gear 134. As a result, the potentiometer 42 can detect relatively small amounts of flexure of the main beam 18 relative to the indicator beam 18, generate distinct electrical signals to indicate these small amounts of flexure, and thus improve the overall electrical resolution of the torque wrench 10.

In another embodiment, a position sensor assembly 140 of FIG. 11 includes a spring-free first position sensor portion 142 and a second position sensor portion 144 with an arcuate gear rack 146. Accordingly, the first position sensor portion 142 may include a first gear 150 rigidly connected to the indicator beam 28 and in geared connection with a second pinion gear 152. As illustrated in FIG. 11, the teeth of the second pinion gear 152 engage the teeth of the rack gear 146 along an arc that at least approximately traces the arcuate path of a point on the main beam 28 as the main beam 28 flexes relative to the static indicator beam 18.

While the present apparatus and methods have been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A position sensor assembly for use in a system in which a first beam moves relative to a second beam, comprising:
- a first position sensor portion fixedly mounted on the first beam, including:
  - a first pinion gear;
  - a second pinion gear operatively engaged with the first pinion gear; and
  - a position sensor engaged with the second pinion gear to sense an amount of displacement of the first beam relative to the second beam; and
- a second position sensor portion fixedly mounted on the second beam, including:
  - a rack gear operatively engaged with the first pinion gear of the first position sensor portion.

2. The position sensor assembly of claim 1, wherein the first pinion gear has a larger diameter than the second pinion gear.

3. The position sensor assembly of claim 1, wherein rack gear is a straight gear.

4. The position sensor assembly of claim 1, wherein the position sensor is a potentiometer that generates an electric signal indicative of an amount of displacement of the first beam relative to the second beam.

5. The position sensor assembly of claim 4, wherein the potentiometer is a rotating potentiometer, and wherein the rotating potentiometer and the second pinion gear are disposed on a common axis.

6. The position sensor assembly of claim 1, wherein the position sensor engages the second pinion gear via at least one intermediate gear.

7. A position sensor assembly for use in a system in which a first beam moves relative to a second beam, comprising:
- a first position sensor portion mounted on the first beam, including:
  - a first pinion gear;
  - a second pinion gear operatively engaged with the first pinion gear, wherein the first position sensor further includes a gear cover having an input portion to receive an end of the first beam; and wherein the first pinion gear and the second pinion gear are rotatably mounted on the gear cover; and
- a second position sensor portion mounted on the second beam, including:
- a rack gear operatively engaged with the first pinion gear of the first position sensor portion.

8. The position sensor assembly of claim 7, further comprising a spring having a first end coupled to the first beam, and a second end coupled to the second pinion gear to push the gear cover against the rack gear.

* * * * *